Figure 4:
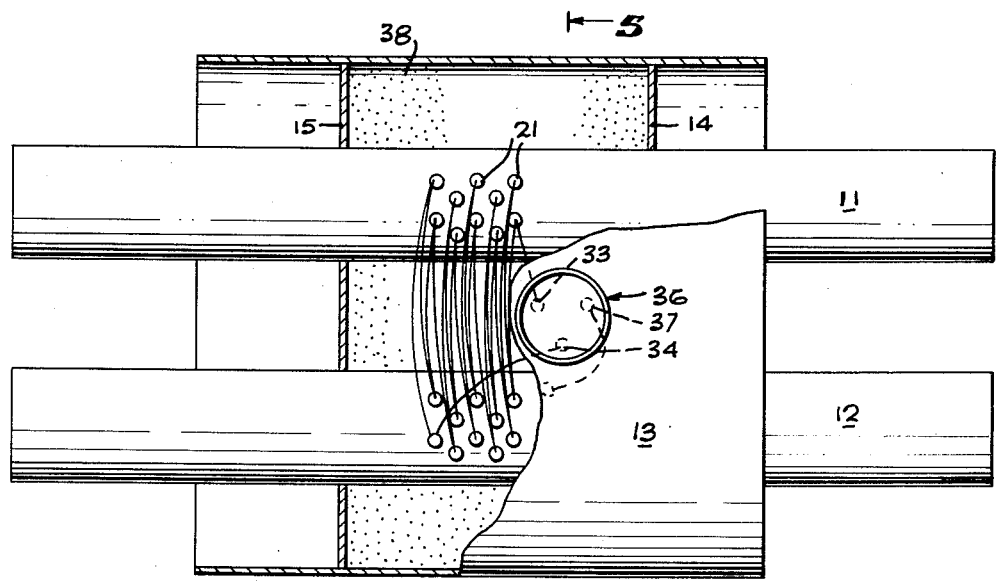

March 8, 1966          D. WALD          3,238,777
DIFFERENTIAL TEMPERATURE TRANSDUCER
Filed Jan. 30, 1963          2 Sheets-Sheet 1
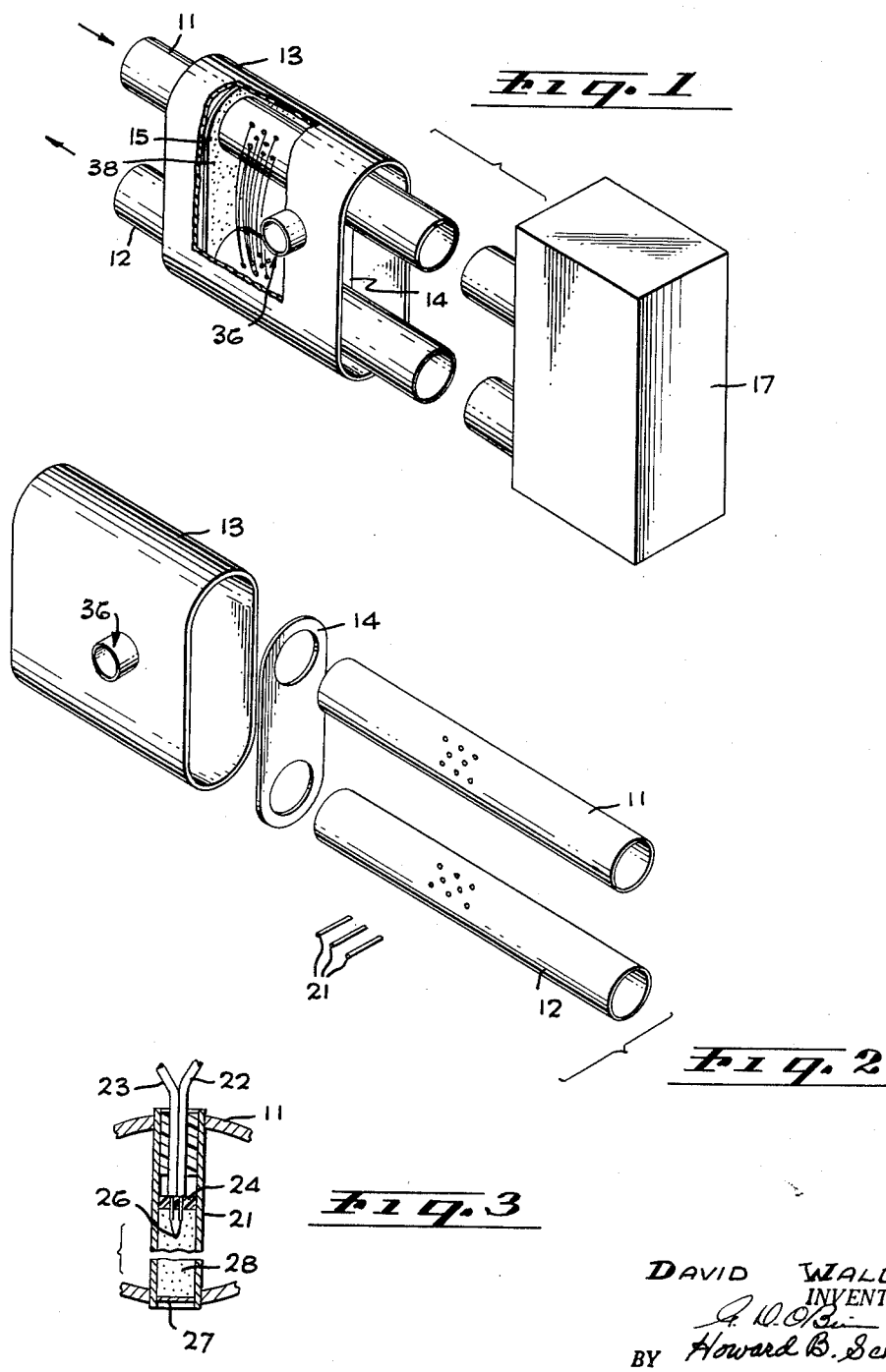
DAVID WALD
INVENTOR.
BY Howard B. Scheckman
ATTORNEYS March 8, 1966 D. WALD 3,238,777
DIFFERENTIAL TEMPERATURE TRANSDUCER
Filed Jan. 30, 1963 2 Sheets-Sheet 2

DAVID WALD
INVENTOR.
BY Howard B. Scheckman

ATTORNEYS

United States Patent Office 3,238,777
Patented Mar. 8, 1966

3,238,777
DIFFERENTIAL TEMPERATURE TRANSDUCER
David Wald, Santa Clara, Calif., assignor to the United States of America as represented by the Administrator of the National Aeronautics and Space Administration
Filed Jan. 30, 1963, Ser. No. 255,132
4 Claims. (Cl. 73—341)
(Granted under Title 35, U.S. Code (1952), sec. 266)

The invention described herein may be manufactured and used by and for the United States of America for governmental purposes without the payment of any royalties thereon or therefor.

The present invention is directed to an improved differential thermopile, particularly adapted to the measurement of cooling water temperature rise in apparatus such as electric arc heaters wherein strong electric and magnetic fields, stray currents within cooling water, and high coolant pressures are experienced.

The accurate measurement of the temperature rise of cooling water flowing through apparatus is often required for the control of such apparatus. In the utilization of thermocouples for this type of measurement, difficulty is often encountered through various characteristics of the environment. Circumstances which deleteriously affect the operation of thermocouples or thermopiles include the presence of ambient electric and magnetic fields, and the presence of stray electrical currents in the cooling water itself. In addition, the utilization of very high water pressures poses certain problems in connection with the employment of conventional temperature measuring devices.

Although the present invention is applicable for the measurement of differential temperatures of a wide variety of fluids under varying circumstances, it is particularly adapted to the measurement of cooling water temperature rise in electric arc heaters. This application of the present invention is particularly exacting because of the unusually difficult environment involved. The arc heater itself emits random frequency signals of extremely high amplitude through a widely varying frequency spectrum. In addition, strong magnetic fields exist in the vicinity of temperature measurement, and if not prevented will produce overriding error voltages. In addition, this type of heater commonly employs cooling water pressures of the order of 1,000 to 5,000 pounds per square inch. In this difficult environment, the present invention operates to rapidly respond to very small differential temperatures and to deliver a signal requiring no external amplification, while producing a very high signal-to-noise ratio, and maintaining a fixed calibration.

Figure 5:
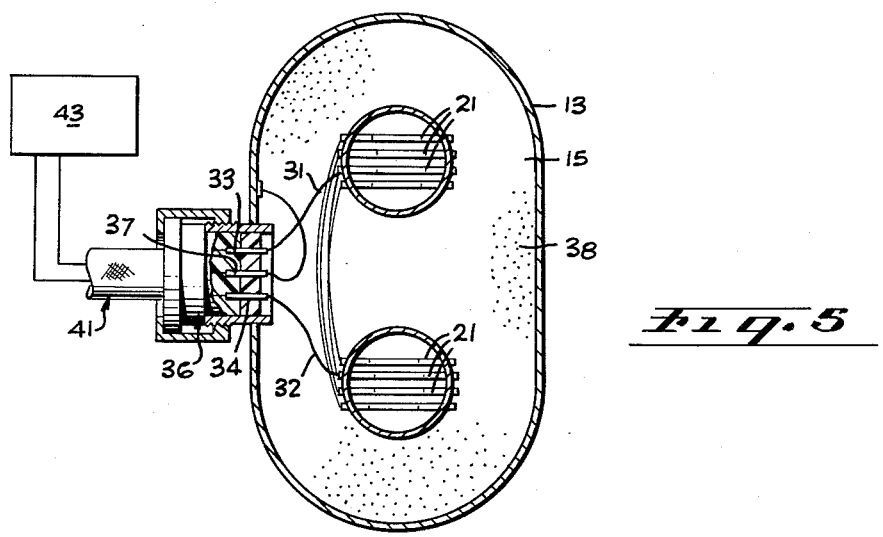

One preferred embodiment of the present invention is illustrated in the accompanying drawings, wherein:

FIGURE 1 is a perspective view of the device with portions broken away to show internal construction;
FIGURE 2 is an exploded view of the device of this invention in perspective;
FIGURE 3 is a sectional view of a thermocouple well in accordance with this invention;
FIGURE 4 is a plan view of the device of this invention with the outer shield partially broken away, as indicated; and
FIGURE 5 is a transverse sectional view taken in the plane 5—5 of FIGURE 4.

The present invention in brief comprises a multiplicity of thermocouples electrically connected in series to multiply the differential signal obtained between one-half of the junctions disposed within one flow tube and the other half disposed within another flow tube. The individual junctions are disposed in thermocouple wells formed as tubes within fluid conduits and sealed by electrical insulating means. Within these wells, the junctions are insulated by a liquid, such as transformer oil, providing good electrical insulation and good heat conductivity. The two flow conduits extend through a housing formed of a ferromagnetic material for shielding the thermopile comprised of the thermocouple junctions described. Electrical leads from the ends of the thermopile extend in insulated relationship through this housing to form output terminals that may be connected across indicating means, such as a galvanometer, or the like. Grounded operation may be provided by electrically connecting the housing to the sheath of a two-wire cable engaging the output terminals.

Considering now the present invention in greater detail and referring first to FIGURES 1 and 2 of the drawings, there will be seen to be provided a pair of like stainless steel tubes 11 and 12. These tubes extend through a flattened cylindrical housing 13, preferably formed of soft carbon iron and having end walls 14 and 15 formed of like material. Each of these end walls has a pair of aligned openings therethrough, and the tubes 11 and 12 fit into these openings in extension through the housing 13. The tubes 11 and 12 are adapted to be inserted in the inlet and outlet lines, respectively, of the cooling water system for apparatus, such as an electric arc heater 17.

Differential temperature sensing is accomplished herein by the provision of a thermopile formed of a plurality of thermocouples electrically connected in series to multiply the signals therefrom. In the illustrated embodiment of the invention there are provided ten hot junctions and ten cold junctions in this thermopile. As illustrated in FIGURE 3, particular provision is made herein for the electrical insulation of the individual thermocouple junctions from fluid flowing in the tubes 11 and 12, and also for the utilization of the invention with very high pressure fluids. To the foregoing ends, there are provided in each of the tube 11 and 12 a plurality of minute transverse cylinders 21 extending laterally through the tube.

Referring to FIGURE 3, it will be seen that the cylinder 21 is sealed to the opposite sides of the flow tube 11, as by silver solder. A pair of thermocouple wires 22 and 23 extend into the tube and through an electrically insulating standoff collar 24. The two thermocouple wires 22 and 23 are joined together at a thermocouple junction 26 within a chamber in the cylinder formed between the collar 24 and an end plate 27. Within this chamber there is disposed an insulating liquid 28 having good heat conductivity properties, such as transformer oil, and the chamber is entirely filled with this liquid. The thermocouple wires 22 and 23 are formed of dissimilar metals, as is conventional in the construction of thermocouples, and are conventionally joined together at the junction 26. These wires, for example, may be formed of iron and constantan, or any of various other combinations of known metals producing a potential difference between hot and cold junctions thereof. As illustrated in FIGURE 3, the thermocouple wires are electrically insulated beyond the standoff collar 24, as is common practice.

As previously stated, there are provided a plurality of thermocouple wells, as just described, in each of the conduits 11 and 12. Referring to FIGURE 4, there is illustrated the location of these wells and the connection of thermocouples to form the thermopile of this invention. The thermocouples are, as illustrated, interconnected from a hot junction to a cold junction to a hot junction, etc. Consequently, there is produced a multiplication effect of the voltages produced by temperature difference between the hot and cold junctions. The internal circuit of the invention includes, in addition to the connections providing the thermopile described, output leads 31 and 32 extending from opposite ends of the thermopile to a pair of output terminals shown as prongs 33 and 34. These output prongs 33 and 34 are mounted in an insulated lead-through member, such as a Cannon plug 36 disposed in a wall of the shield housing 13. In addition to these two output prongs, the plug 36 also includes a third prong 37 also extending exteriorly of the shield housing 13 and electrically connected internally of the housing to the shield itself. This prong 37 then provides a ground connection which is desirable for certain applications of the present invention.

In physical structure, the device of the present invention is formed as an integral unit with the tubes or conduits 11 and 12 physically secured as by silver solder to the end plates 14 and 15, so as to seal the volume within the housing about the thermopile. This volume is preferably filled with an epoxy potting compound 38, such as "Scotchcast" to thereby fully insulate all electrical connections within the device and to additionally protect the device from mechanical shock, or the like.

In utilization of the device of the present invention, the flow conduits or tubes 11 and 12 are connected in the inlet and outlet lines of the cooling water system of the unit, such as an arc heater, for example. Electrical connection is made to the device by means of a shielded two-wire cable 41 having a suitable three-hole female plug 42 at the end thereof. This plug engages the three output prongs 33, 34, and 37 of the device, with the ground prong 37 then being electrically connected to the metallic sheath of the cable 41. Any suitable indicating or recording device is then connected to the wires of the cable to indicate the voltage produced by temperature differences in the fluid flowing through the two conduits 11 and 12.

In FIGURE 5 there is schematically illustrated an indicating device, such as a galvanometer 43, connected across the cable wires. Preferably, this indicating device 43 is a current-sensitive galvanometer type recorder, and it is to be noted that the electromagnetic shielding of the present invention is made continuous by connecting the housing 13 to the cable shielding through the third prong of the device.

In the particular application suggested above, i.e., the indication of temperature differences in the inlet and outlet cooling water to an arc heater, it will appreciated that strong electric and magnetic fields exist in the vicinity of the heater. The electromagnetic shielding afforded by the soft iron housing 13 and end walls thereof prevent these magnetic fields from inducing spurious error signals in the device. Stray electrical currents will also appear in the cooling water, and the present invention precludes these signals from influencing the thermocouples, inasmuch as the thermocouple junctions are electrically insulated from the fluid. In addition, the particular thermocouple well configuration employed herein provides for the utilization of this invention with very high pressure fluid flow.

It will be appreciated that a strainer may be advantageously employed in the flow conduits 11 and 12 in order to prevent solid particles from becoming enmeshed in the thermocouple wells and blocking the flow of fluid through the transducer. Under the conditions wherein vapor bubbles may exist in the fluid, it is also advantageous to provide some type of flow swirler, or the like, in order to suppress the bubbles and cause them to recondense back to the liquid state prior to passage of the fluid over the thermocouples. This is advantageous inasmuch as the device of the present invention detects temperature difference and not the existence of latent heat of vaporization. The device of this invention may be employed with a wide variety of indicating means, including both visual indicators, such as a galvanometer, or recording apparatus, such as a recording galvanometer. Furthermore, the output signal from the device of the present invention may also be employed as a signal element in an automatic control system for the regulation of temperature differential in flow processes. It is particularly noted at this point that the device of this invention produces a very substantial output signal requiring no amplification for normal utilization. This is highly advantageous in many applications, and clearly serves to reduce the complexity of measuring apparatus of this type.

Aside from the obvious utilization of the present invention as a differential temperature transducer, it is also possible to employ the device of the present invention in combination with a flow meter having a voltage signal output and to combine the flow meter output and the differential temperature transducer output multiplicatively to thereby produce an indication of heat flux. Such a combination would then comprise a heat flux transducer.

Although the present invention has been described in connectoin with a single preferred embodiment thereof, and in connection with one particular application, it is to be understood that no limitation is intended upon the invention by this manner of description. Reference is made to the appended claims for a precise delineation of the true scope of the present invention.

What is claimed is:

1. An improved differential thermopile comprising a pair of conduits adapted to carry fluid, means fixing said conduits in close proximity, a magnetic shield about said conduits, an insulated lead-through member extending through said shield and having at least two output terminals, a plurality of like thermocouples, one half of said thermocouples being disposed in each of said conduits, means electrically connecting said thermocouples in series, and means connecting said series of thermocouples across said output terminals.

2. Apparatus for producing a voltage proportional to the difference in temperature of fluid in separate conduits comprising a plurality of minute tubes disposed transversely in said conduits, an electrically insulating liquid contained in each of said tubes, means sealing the tubes, a thermocouple junction disposed in each of said tubes and electrically insulated therefrom by said liquid, means electrically connecting said junctions in series between a pair of output terminals, an electromagnetic shielding means surrounding said conduits about said tubes.

3. A differential temperature sensing device comprising a closed housing having a pair of end walls and formed of ferromagnetic material, a pair of pipes extending through said end walls and engaged by said end walls, said pipes being adapted for connection in fluid flow lines, a plurality of minute tubes extending transversely into each of said pipes within said housing, a plurality of thermocouples disposed with a junction of each in a separate tube, electrical insulating means sealing said tubes to define a chamber about the junction therein, an electrically insulating liquid of good heat conducting characteristics filling each of said chambers about said junctions, means electrically connecting said thermocouples in series-adding relationship across a pair of output leads, and output terminals connected to said output leads and extending in insulated relation through said housing for connection across indicating means.

4. A differential temperature transducer comprising a ferromagnetic housing having end walls and defining a chamber, a pair of flow tubes extending through said chamber and joined to said end walls in extension exteriorly thereof for connection in fluid flow lines, a plurality of thermocouple wells disposed in each of said tubes and each including a minute cylinder with sealed ends extending transversely through the tube, a plurality of thermocouple junctions disposed one in each of said wells, means, connecting said junctions in series as a thermopile, an electrically insulating liquid filling each of said wells and insulating the junction therein from the well cylinder, an output plug having three terminals extending in insulated relation through said housing, means electrically connecting a first of said terminals to said housing, means connecting said thermopile across second and third terminals of said output plug, and electrically insulating means filling said chamber about said tubes and thermopile.

References Cited by the Examiner

UNITED STATES PATENTS 3,167,957  2/1965  Ziviani _____ 73—193
3,174,340  3/1965  Britt _____ 73—343

DAVID SCHONBERG, *Primary Examiner.*

LOUIS R. PRINCE, D. McGIEHAN,
*Assistant Examiners.*